(12) United States Patent
Hayakawa et al.

(10) Patent No.: US 8,515,405 B2
(45) Date of Patent: Aug. 20, 2013

(54) COMMUNICATION DEVICE

(75) Inventors: Hideki Hayakawa, Hachioji (JP); Akira Ishikura, Kawasaki (JP)

(73) Assignee: Fujitsu Mobile Communications Limited, Kawasaki (JP)

( * ) Notice: Subject to any disclaimer, the term of this patent is extended or adjusted under 35 U.S.C. 154(b) by 1262 days.

(21) Appl. No.: 12/148,789

(22) Filed: Apr. 22, 2008

(65) Prior Publication Data

US 2009/0017806 A1 Jan. 15, 2009

(30) Foreign Application Priority Data

Jul. 9, 2007 (JP) ................................ P2007-179994

(51) Int. Cl.
 *H04M 3/42* (2006.01)
(52) U.S. Cl.
 USPC ........ 455/415; 455/418; 455/575.1; 455/551; 455/564; 455/566
(58) Field of Classification Search
 USPC ............... 455/566–567, 466, 575.1, 415–418
 See application file for complete search history.

(56) References Cited

U.S. PATENT DOCUMENTS

| | | | |
|---|---|---|---|
| 7,054,666 B2 * | 5/2006 | Shibuya | 455/566 |
| 7,308,277 B2 * | 12/2007 | Yomoda | 455/466 |
| 7,693,556 B2 * | 4/2010 | Park et al. | 455/575.1 |
| 2006/0286970 A1 | 12/2006 | Otobe et al. | |
| 2007/0037605 A1 * | 2/2007 | Logan | 455/567 |

FOREIGN PATENT DOCUMENTS

| | | | |
|---|---|---|---|
| EP | 1378856 | * | 1/2002 |
| JP | 2000-181818 A | | 6/2000 |
| JP | 2003-319060 A | | 11/2003 |
| JP | 2006-148725 A | | 6/2006 |
| WO | 2005/009007 A1 | | 1/2005 |

OTHER PUBLICATIONS

Japanese Office Action dated Oct. 18, 2011 as received in related application No. 2007-179994.
JP Office Action mailed on Aug. 21, 2012 as received in application No. 2007-179994.

* cited by examiner

*Primary Examiner* — Kiet Doan
*Assistant Examiner* — Michael T Vu
(74) *Attorney, Agent, or Firm* — Maschoff Brennan

(57) ABSTRACT

According to an aspect of the invention, there is provided a communication device including: a communication unit configured to communicate with an opponent by an electric communication network; a vibration unit configured to generate a vibration at a predetermined vibration pattern; a storage unit configured to store identification information about the opponent; a display unit configured to listing the identification information; an operation unit configured to accept an operation for moving a cursor which points at one of identification information listed by the display unit; and a control unit configured to activate the vibration unit in accordance with the one of identification information pointed at with the cursor.

18 Claims, 12 Drawing Sheets

FIG. 3

| NAME | TYPE | PHONE NUMBER |
|---|---|---|
| MR. SMITH | PORTABLE CELLULAR PHONE | 080-0000-0000 |
| MR. SMITH | HOME | 06-1111-1111 |
| MS. HILL | PORTABLE CELLULAR PHONE | 090-2222-2222 |
| MS. HILL | OFFICE | 03-3333-3333 |
| MS. HILL | HOME | 03-4444-4444 |
| MR. JOHNSON | PORTABLE CELLULAR PHONE | 090-5555-5555 |

FIG. 4

| NAME | TYPE | PHONE NUMBER |
|---|---|---|
| MR. SMITH | PORTABLE CELLULAR PHONE | 080-0000-0000 |
| MR. SMITH | HOME | 06-1111-1111 |
| MS. HILL | PORTABLE CELLULAR PHONE | 090-2222-2222 |
| MS. HILL | OFFICE | 03-3333-3333 |
| MS. HILL | HOME | 03-4444-4444 |
| MR. JOHNSON | PORTABLE CELLULAR PHONE | 090-5555-5555 |

FIG. 5

| NAME | TYPE | PHONE NUMBER |
|---|---|---|
| MR. SMITH | PORTABLE CELLULAR PHONE | 080-0000-0000 |
| MR. SMITH | HOME | 06-1111-1111 |
| MS. HILL | PORTABLE CELLULAR PHONE | 090-2222-2222 |
| MS. HILL | OFFICE | 03-3333-3333 |
| MS. HILL | HOME | 03-4444-4444 |
| MR. JOHNSON | PORTABLE CELLULAR PHONE | 090-5555-5555 |

*TODAY IS BIRTHDAY*

| NAME | TYPE | PHONE NUMBER |
|---|---|---|
| MR. SMITH | PORTABLE CELLULAR PHONE | 080-0000-0000 |
| MR. SMITH | HOME | 06-1111-1111 |
| MS. HILL | PORTABLE CELLULAR PHONE | 090-2222-2222 |
| MS. HILL | OFFICE | 03-3333-3333 |
| MS. HILL | HOME | 03-4444-4444 |
| MR. JOHNSON | PORTABLE CELLULAR PHONE | 090-5555-5555 | aaa@bbb.ne.jp
TITLE: GOOD EVENING

COMMUNICATION DEVICE

CROSS-REFERENCE TO RELATED APPLICATIONS

This application is based on and claims the benefit of priority from the prior Japanese Patent Application No. 2007-179994, filed on Jul. 9, 2007; the entire contents of which are incorporated herein by reference.

TECHNICAL FIELD

The present invention relates to a communication device.

DESCRIPTION OF RELATED ART

A communication device can perform transmission by selecting any one phone number from registered phone directory data through use of a phone directory function. In addition to phone numbers, names, types of phone numbers (e.g., phone number for private purpose, phone numbers for business purpose, phone numbers of portable cellular phones, phone numbers of land-line phones, and the like), E-mail addresses, postal addresses, birthdays, and the like, can be registered in the phone directory data. However, a user with a visual disability who cannot see a display screen has to memorize key operation for selecting a phone number of a desired opponent and perform transmission operation by selecting the phone number. Further, it has been difficult for a person with weak eyesight to see a small display, such as an icon. Accordingly, an information communication device capable of originating a phone call by only a voice without viewing a display screen has been put forward (see; for example, JP-A-2003-319060).

SUMMARY

It is disclosed by JP-A-2003-319060, that registered names and phone numbers are read aloud at the time of selection of the phone directory data, whereby the user who does not visually ascertain a screen display can know currently-selected data. However, persons around the user may possibly listen to user's voice. Further, when names and phone numbers are read, voice synthesis processing and reading operation take much time. Moreover, registered data other than names and phone numbers are not read aloud, the type of a phone number, for example, is not read aloud. Therefore, the user should determine the type of a phone number by listening to the phone number read aloud. In addition, data, such as postal addresses and birthdays, cannot be utilized. In a case where the user does not notice a display of an icon or illumination of an LED when an electronic mail is received and remains unread, the arrival of an unread E-mail is not notified to the user by reading the phone directory data aloud. Therefore, in spite of arrival of the E-mail, the user makes a contact without ascertaining contents of the E-mail.

According to an aspect of the invention, there is provided a communication device including: a communication unit configured to communicate with an opponent by an electric communication network; a vibration unit configured to generate a vibration at a predetermined vibration pattern; a storage unit configured to store identification information about the opponent; a display unit configured to listing the identification information; an operation unit configured to accept an operation for moving a cursor which points at one of identification information listed by the display unit; and a control unit configured to activate the vibration unit in accordance with the one of identification information pointed at with the cursor.

BRIEF DESCRIPTION OF THE DRAWINGS

In the accompanying drawings:

FIG. 3 shows an example in which the portable cellular phone of the embodiment lists phone directory data;

FIG. 4 shows an example in which the portable cellular phone of the embodiment lists phone directory data;

FIG. 5 shows an example display in which notification about a birthday is made when the portable cellular phone of the embodiment lists phone directory data;

DESCRIPTION OF EMBODIMENTS

An embodiment of the present invention will be described hereunder by reference to the drawings. In the embodiment, a portable cellular phone that is an example of the communication device will be described.

Figure 1:
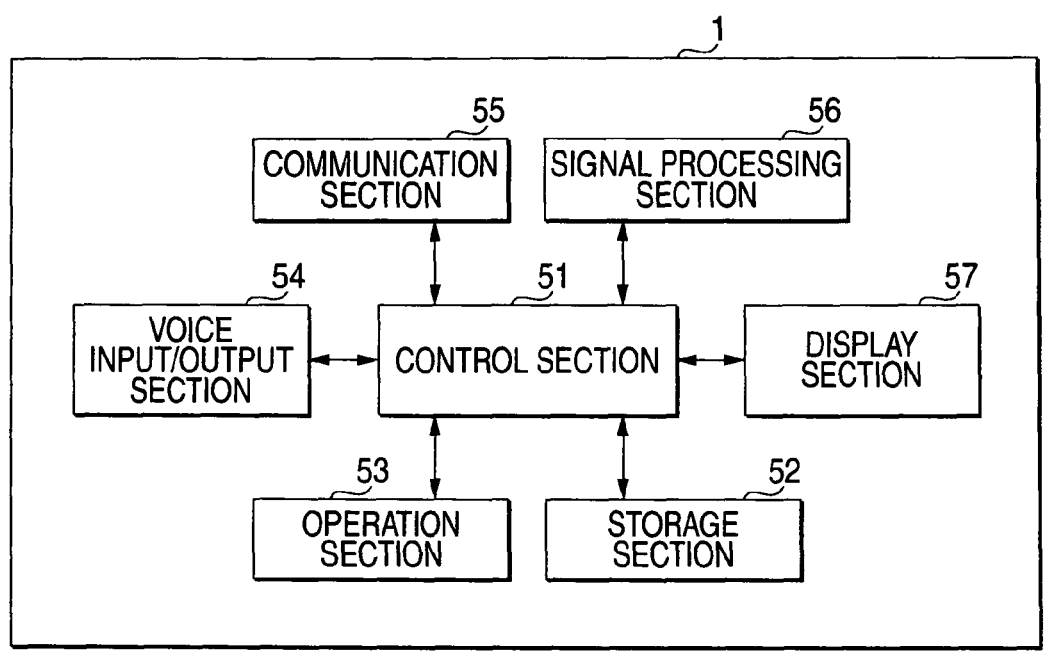
FIG. 1 is a block diagram showing the configuration of a portable cellular phone of an embodiment of the present invention.

FIG. 1 is a block diagram of a portable cellular phone 1 of the embodiment of the present invention. The portable cellular phone 1 includes a control section 51 that controls the entirety of the phone. The control section 51 is connected to a storage section 52, an operation section 53, a voice input/output section 54, a communication section 55, a signal processing section 56, and a display section 57.

The storage section 52 stores user data, such as a phone directory database (DB), and application programs. A plurality of sets of phone directory data can be registered in the phone directory DB.

Information that can be registered in the phone directory data will be described later.

The operation section 53 is used as means by which a user inputs operation and made up of input keys. An operational input performed by the user includes; for example, call originating operation, operation for receiving an incoming call, operation for calling a phone directory, operation for setting a phone directory, operation for selecting a phone directory, and the like.

The voice input/output section 54 is a microphone, a speaker, and the like. A voice signal is input by the microphone, and sound is output by the speaker.

An antenna is connected to the communication section 55 and has a transmission function of transmitting to a base station information that has been converted into a radio wave by the antenna and a receiving function for receiving the radio wave from the base station and converting the thus-received radio wave into an electric signal. The signal processing section 56 processes digital signals, such as a video signal, a voice signal, and an audio signal. For instance, when a voice signal is transmitted from the communication section 55, the signal processing section 56 subjects to encoding and error control the voice input by the voice input/output section 54, and transmits the thus-processed voice signal by the communication section 55.

The display section 57 is a liquid-crystal display, an organic EL display, and the like. Pursuant to control of the control section 51, the display section 57 displays a text and an image conforming to the operating state of the portable cellular phone 1.

Names, phone numbers, E-mail addresses, postal addresses, birthdays, and the like, can be registered, in an associated manner, as phone directory data registered in the phone directory DB of the portable cellular phone 1 having such a configuration. Although one name and one birthday are registered in connection with a single piece of phone directory data, a plurality of phone numbers and a plurality of E-mail addresses can be registered in connection with one piece of the phone directory data. Further, notification unit for the user employed at the time of arrival of an incoming call from a telephone number registered in the phone directory data or receipt of an E-mail from an E-mail address registered in the same can be set for each of the phone number and the E-mail addresses registered in the phone directory data. The notification unit includes a sound, illumination of an LED, a vibrator, and the like, and enables setting of a sound, the color of illumination of the LED, an illumination pattern, and an operating pattern of the vibrator. In the portable cellular phone 1, even when a plurality of phone numbers, such as a phone number of a house and a phone number of a portable cellular phone, are registered in one piece of phone directory data, notification unit can be set for each phone number. Therefore, the user can identify, by the notification unit, whether an incoming call originates from the phone number of the home or the phone number of the portable cellular phone. Further, the notification unit that is operated when a call is originated to a phone number in the phone directory data can also be set for each phone number or an E-mail address. Alternatively, settings of the notification unit that is operated at the time of arrival of an incoming call to a phone number and settings of the notification unit that generates a sound at the time of origination of a call may also be common.

Figure 2:
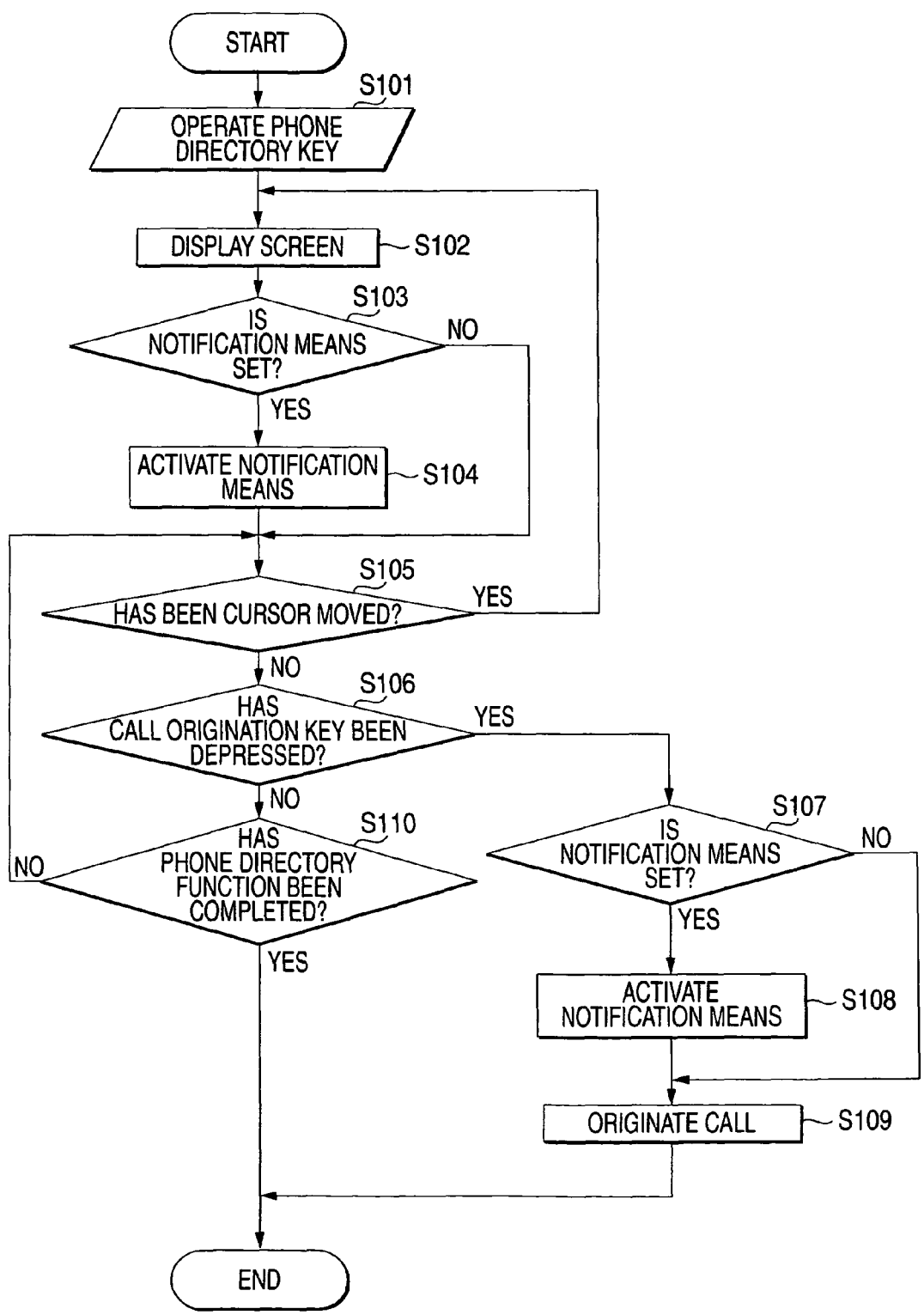
FIG. 2 is a flowchart showing processing performed when the portable cellular phone of the embodiment originates a call after listing phone directory data.

The thus-registered phone directory data can be listed on the display section 57 by an operational input performed by the user. FIG. 2 shows processing of the control section 51 performed when a call is originated after listing of the phone directory data. When the control section 51 detects that the operation section 53 has performed phone directory start-up operation (S101), the display section 57 displays as a list phone directory data equal in number to the maximum number of pieces of data that can be displayed on the display section 57 (S102). Information displayed at this time is some of information in the phone directory data. FIG. 3 shows a case where, of the pieces of information of the phone directory data, names, phone numbers, and the types of phone numbers are listed. At the time of listing operation, they are displayed while one of the pieces of the phone directory data is pointed at with a cursor. In FIG. 3, a state where one of the pieces of the phone directory data is pointed at with the cursor is illustrated by a thick border. Although the types of phone numbers are displayed in letter in FIG. 3, the type may also be provided in the form of a display, such as an icon. When any one of the pieces of the listed phone directory data is selected, detailed data registered in each of the pieces of the phone directory data, such as a postal address, a birthday, and the like, are also displayed. A display background color of the phone directory data can be registered in association with a phone number of the phone directory data. When the display background color is registered, the display background of a corresponding piece of phone directory data is filled in with the registered color at the time of listing of the phone directory data. FIG. 4 is a view showing a state where the display background is filled. Although filled areas are illustrated in FIG. 4 by hatch lines or stripes for the sake of explanation, the areas are filled in with the display background color (e.g., blue or yellow) registered in the phone directory data and in such a density that letters are legible.

As a result of a display background color being set on frequently-called phone numbers as mentioned above, a desired phone number becomes easy to find. Even when difficulty is encountered in making out a display of a phone number because of weak eyesight, ascertainment of the phone number becomes easy.

Referring to FIG. 2, when notification unit for call origination is registered in association with the piece of the phone directory data pointed at with the cursor (Yes in S103) at the time of listing of the phone directory data, the notification unit is activated (S104). The vibrator may also be set in such a way that the vibrator operates so as to create weak vibrations at the outset regardless of a preset vibration pattern and create stronger vibrations gradually. As a result, a fall of the terminal, which would otherwise be caused when the user is amazed as a result of the phone being operated along with abrupt strong vibration, can be prevented.

When operation for moving the cursor performed by the operation section 53 is detected (Yes in S105), the display on the display section 57 is switched, thereby displaying a list of phone directory data achieved after movement of the cursor, and processing pertaining to steps S102 through S105 is iterated. When operation for originating a call by the operation section 53 is detected (Yes in S106) and when notification unit for call origination is registered in connection with the phone number of the opponent (Yes in S107), the notification unit is activated (S108), and a call is originated (S109). Alternatively, the notification unit may also be activated in the middle of ringing operation subsequent to call origination performed in step S109 rather than activated in step S108.

In FIG. 2, the notification unit is described to be activated both when any of the pieces of the phone directory data is pointed at with the cursor and when a call is originated. However, the notification unit may also be activated in either of the situations. When operation for originating a call is performed by a direct input of a phone number by the operation section 53 or when operation for originating a call is performed by selection of a phone number from information about the history of incoming calls and originated calls, a determination is made as to whether or not the phone number is registered in the phone directory DB. When the phone number is registered in the phone directory DB and when notification unit is registered in association with the phone number, the notification unit may also be activated at the time of origination of a call. Moreover, in FIG. 2, the notification unit found when pointing is performed by the cursor and the notification unit found when a call is originated are described to be identical, the notification unit may also be different so that the user can ascertain whether the current status is a time when pointing is performed with a cursor or a time when a call is originated. Alternatively, the notification unit for call origination registered in the phone directory data may also be activated after activation of any notification unit showing that the current status is the time of origination of a call. Furthermore, a display appearing at the time of listing of the phone directory data is not limited to a phone number but may also be an E-mail address. A display background color and notification unit may also be set for each E-mail address, and the notification unit may also be activated in accordance with the E-mail address pointed at with the cursor.

As mentioned above, even the user who does not visually ascertain the display section 57 can be notified of which one of the phone numbers in the phone directory data is pointed at with the cursor and which one of the phone numbers in the phone directory data is employed for call origination, by using the notification unit including a vibrator at the time of listing of the phone directory data and call origination. Thus, call origination, which would otherwise be caused by dialing of a wrong phone number, can be prevented.

Such a notification unit using the vibrator can be used not only for notifying a phone number and an E-mail address of a call originator but also for notifying various pieces of information about an opponent (hereinafter, referred to as "an opponent"). For instance, it may also be possible to set an operation pattern of the vibrator according to the type of a phone number or an E-mail address (e.g., a phone number is for a business purpose or private purpose; the phone number is for a portable cellular phone or not; and the like). Alternatively, a determination is made as to whether a call of interest is a domestic call or an oversea call, by reference to the phone numbers registered in the phone directory data. An operation pattern of the vibrator for a domestic call may be made different from an operation pattern of the vibrator for an oversea call, thereby enabling the user to be notified of whether the phone call is a domestic call or an oversea call. The operation pattern of the vibrator employed herein includes an "inoperative" pattern, too. For example, notification may also be made after a determination has been made as to whether the phone call is a call originated through use of a wireless LAN or a call originated by use of a radiowave emitted from a portable cellular phone cell site. Further, there may also be made notification about whether an opponent is a land-line phone or a portable cellular phone. Moreover, there may also be made notification about whether a phone call is a no-charge call or a chargeable call. For instance, the operation pattern of the vibrator may also be changed depending on a carrier of the portable cellular phone used by a party on the other of communication. In relation to a determination as to a carrier, the user may also register carriers in the phone directory data by himself/herself, or the carrier may also be determined by use of first four to six digits of the phone number assigned to respective carriers. For example, when an international phone is originated, there may be made notification about whether the current time of a called party is in the daytime or at night. In order to determine whether the current time of the called party is in the daytime or at night, an available method is to acquire positional information about the phone of a call originator by a GPS or the like; acquire a time difference from postal address information about the called party registered in the phone directory data and the positional information about the phone of the call originator; and acquire the current time of the opponent by use of the time clocked at the portable cellular phone of the call originator and the time difference information. Alternatively, in addition to storage of the postal address information about the called party in the phone directory data, the postal address information about the user of the portable cellular phone 1 may also be stored in the storage section 52, and a time difference may be acquired from the respective pieces of postal address information, thereby acquiring the current time of the called party by use of a time clocked by the user's portable cellular phone and the time difference information.

In relation to information about an opponent, when a coincidence exists between, for example, a birthday registered in the phone directory data and a today's date, the birthday may also be notified by use of the vibrator or a sound. In addition, the user may also be notified of the birthday by a display on the display section 57. In relation to the display, letters may also be displayed as shown in FIG. 5, or an image may also be displayed. A display, such as that shown in FIG. 5, is displayed when a piece of the phone directory data for which the birthday and a today's date coincide with each other is pointed at with the cursor. By such a display, information can be easily provided to a person with weak eyesight. Further, since information showing that today is a birthday can be displayed in the middle of listing of the phone directory data, such a display is useful for a person who can visually ascertain the display section 57, as well. So long as an anniversary other than a birthday is registered as phone directory data, what is notified is not limited to a birthday. When an anniversary other than a birthday is registered, date information and a character string are stored in an associated manner in the phone directory data. The character string is displayed at the time of displaying of the anniversary on the display section 57. Notification that today is a birthday may also be made at the time of arrival of an incoming call as well as at the time of origination of a call.

Figure 6:
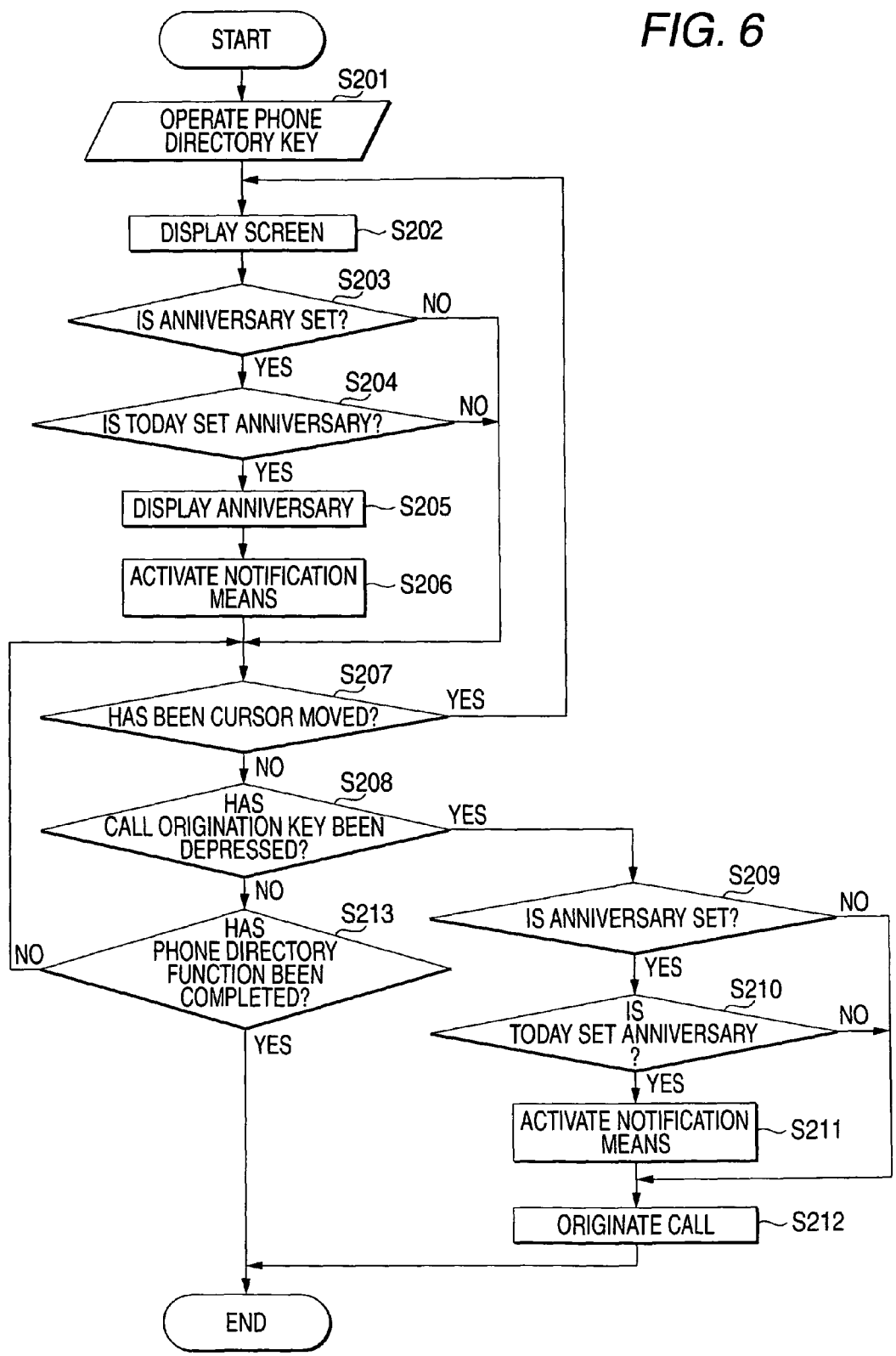
FIG. 6 shows a flowchart showing processing for notifying an anniversary when the portable cellular phone of the embodiment originates a call after listing phone directory data.

FIG. 6 shows a flowchart of processing for activating the notification unit in accordance with the anniversary registered in the piece of the phone directory data pointed at with the cursor when a call is originated after displaying of the phone directory list. When the control section 51 detects that operation for activating a phone directory is performed by the operation section 53 (S201), pieces of the phone directory data equal in number to pieces of information that can be displayed on the display section 57 are listed on the display section 57 (S202).

When the list is displayed, the phone directory data are displayed while one of the pieces of the phone directory data is pointed at with the cursor. An anniversary is set on the piece of the phone directory data pointed at with the cursor (Yes in S203). When the set anniversary is a today's date (Yes in S204), a display showing that the anniversary is registered in the phone directory data is provided on the display section 57 (S205), and the notification unit is activated (S206).

When the control section 51 detects that operation for moving a cursor is performed by the operation section 53 (Yes in S207), the display on the display section 57 is switched, to thus display a list of the phone directory data over which the cursor has been moved, and processing pertaining to steps S202 to S207 is iterated. When the control section 51 detects that call origination operation is performed by the operation section 53 (Yes in S208), an anniversary is set on the phone directory data (Yes in S209). When the set anniversary is a today's date (Yes in S210), the notification unit is activated (S211), thereby originating a call (S212). In FIG. 6, processing is arranged so as to activate the notification unit both at the time of listing of a phone directory and at the time of the origination of a call. However, the notification may also be activated either of the situations.

Figures 7, 8:
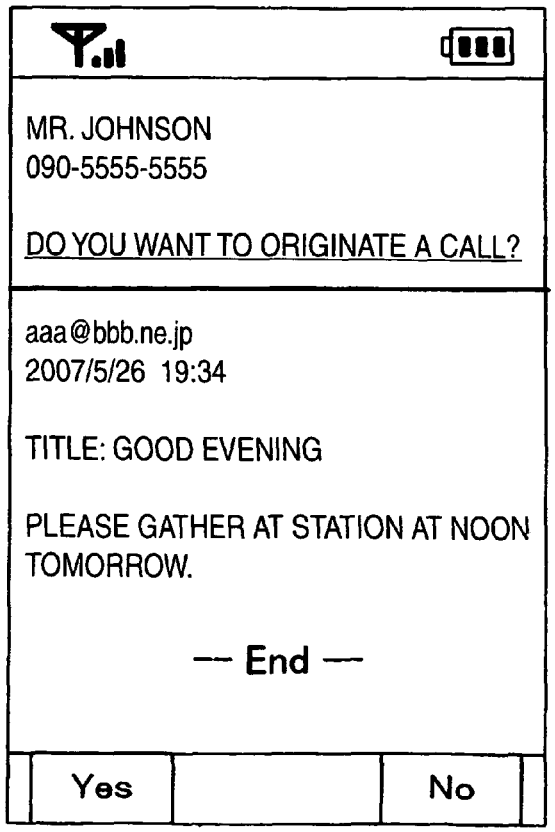
FIG. 7 shows an example display in which presence of an unread E-mail is notified when the portable cellular phone of the embodiment lists phone directory data.
FIG. 8 shows an example display in which the portable cellular phone of the embodiment displays an unread E-mail after detecting call origination operation.

For instance, information about the presence of an unread E-mail may also be notified as information about an opponent at the time of listing of the phone directory data or call origination. When the phone directory data are listed on the display section 57, an E-mail address is acquired from the phone directory data in which the displayed phone number pointed at with the cursor is registered. The E-mail address is not singular. When a plurality of E-mail addresses are associated with the same phone directory data, the plurality of E-mail addresses are acquired. A check is made whether an unread E-mail originated from any of these E-mail addresses is present in a received E-mail DB stored in the storage section 52. If the unread E-mail is present, notification is made by the notification unit, such as a vibrator or sound, and a display is provided. For instance, specifics of the display may be a source address of an unread E-mail, the title of the E-mail, or a portion of a main body of the E-mail, as shown in FIG. 7. Alternatively, a message notifying presence of unread E-mails, such as "Two Unread E-mails," may also be acceptable. When predetermination operation is input by the operation section 53 while the display is being displayed, any of a source mail address of the unread E-mail, a receiving time and date, a title, and a main body of the E-mail, or combinations thereof, may also be displayed on the display section 57. Alternatively, all received E-mails or only unread E-mails may also be listed. In a case where the portable cellular phone 1 is equipped with a voice reading function, when the voice reading function is used while an unread E-mail is displayed on the display section 57, the main body and a sender of the unread E-mail are also read aloud. Thus, even when the user cannot visually ascertain the display section 57, the user can ascertain the presence of unread E-mails with the notification unit, such as a vibrator, by only moving the cursor by the operation section 53 while the list of the phone directory data is displayed on the display section 57. The user can also grasp contents of the E-mail by use of the voice reading function. Therefore, when attempting to make a phone call, the user can reliably ascertain contents of an E-mail from an opponent.

In a case where the presence of an unread E-mail is notified at the time of origination of a call, when the control section 51 detects that call origination operation is performed by the operation section 53, an E-mail address, which is identical with the phone number of an opponent and registered in the phone directory data, is acquired, and a determination is made as to whether or not an unread E-mail whose source address coincides with the E-mail address is present in the received mail DB of the storage section 52. When the unread E-mail is present, notification is made by the notification unit, such as a vibrator and sound, and a source mail address, a receiving time and date, a title, and a main body of the E-mail are displayed on the display section 57. Displaying the unread E-mail on the display section 57 may also be performed by suspending communication processing performed by the communication section 55 or in the middle of communication processing being performed by the communication section 55. When the unread E-mail is displayed by suspending communication processing performed by the communication section 55, the presence of an unread E-mail is notified by the vibrator, sound, and the like. After an unread E-mail is displayed as shown in, for example, FIG. 8 and after operation for a selection as to whether or not to originate a call is received by the operation section 53, communication processing performed by the communication section 55 is initiated. When the voice reading function is used while the screen shown in FIG. 8 is displayed, voice reading out an E-mail address, a receiving time and date, the title of an E-mail, and the main body of an E-mail is output from the voice input/output section 54. When the unread E-mail is displayed by suspending communication processing performed by the communication section 55, the communication section 55 may also receive not-yet-received E-mails from a mail server before a determination is made as to whether or not unread E-mails are present.

Figure 9:
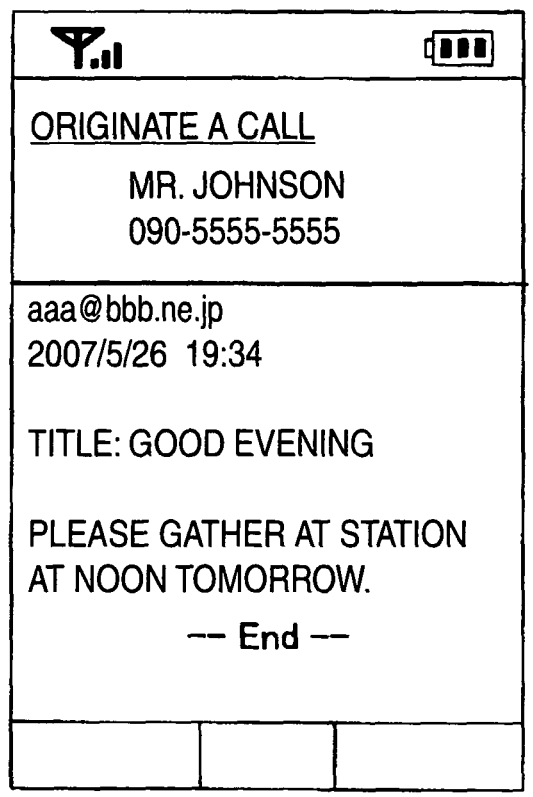
FIG. 9 shows an example display in which the portable cellular phone of the embodiment displays an unread E-mail after detecting call origination operation.

When an unread E-mail is displayed during the course of communication processing performed by the communication section 55, the presence of the unread E-mail is notified by a vibrator, sound, and the like, and a display showing that the call origination is in process (or telephone conversation is in process) and a display of an unread E-mail are provided, as shown in FIG. 9, as well. When a screen shown in FIG. 9 is displayed, on-hook operation can be performed by the operation section 53. When on-hook operation is performed by the operation section 53, a display of the unread E-mail may also be cleared by operation differing from the on-hook operation without clearing the display of the unread E-mail on the screen shown in FIG. 9. For instance, if on-hook operation is performed by the operation section 53 while the screen shown in FIG. 9 is displayed, the display may also be changed to a display, such as that shown in FIG. 8. If off-hook operation is instructed by the operation section 53 while the screen display shown in FIG. 8 is displayed, a call is re-originated by the phone number displayed in FIG. 8. Thus, when the user realized the presence of an unread E-mail after origination of a call and desires to ascertain the unread E-mail, the user can readily perform on-hook operation once, to thus ascertain the unread E-mail, and re-originate a call. Moreover, when the screen shown in FIG. 8 is displayed, displayed contents (an unread E-mail, a phone number of a party on the other end of a line, and the like) are converted into a voice signal by the voice reading function, and the voice signal can also be output from the voice input/output section 54. Although explanations are given to the case where there is only one unread E-mail by reference to FIGS. 8 and 9, a plurality of unread E-mails may also be listed when there are a plurality of unread E-mails. Alternatively, an unread E-mail to be displayed may also be switched in accordance with operation of the operation section 53. In addition, a notification pattern of the vibrator, or the like, may also be changed according to the number of unread E-mails.

Figure 10:
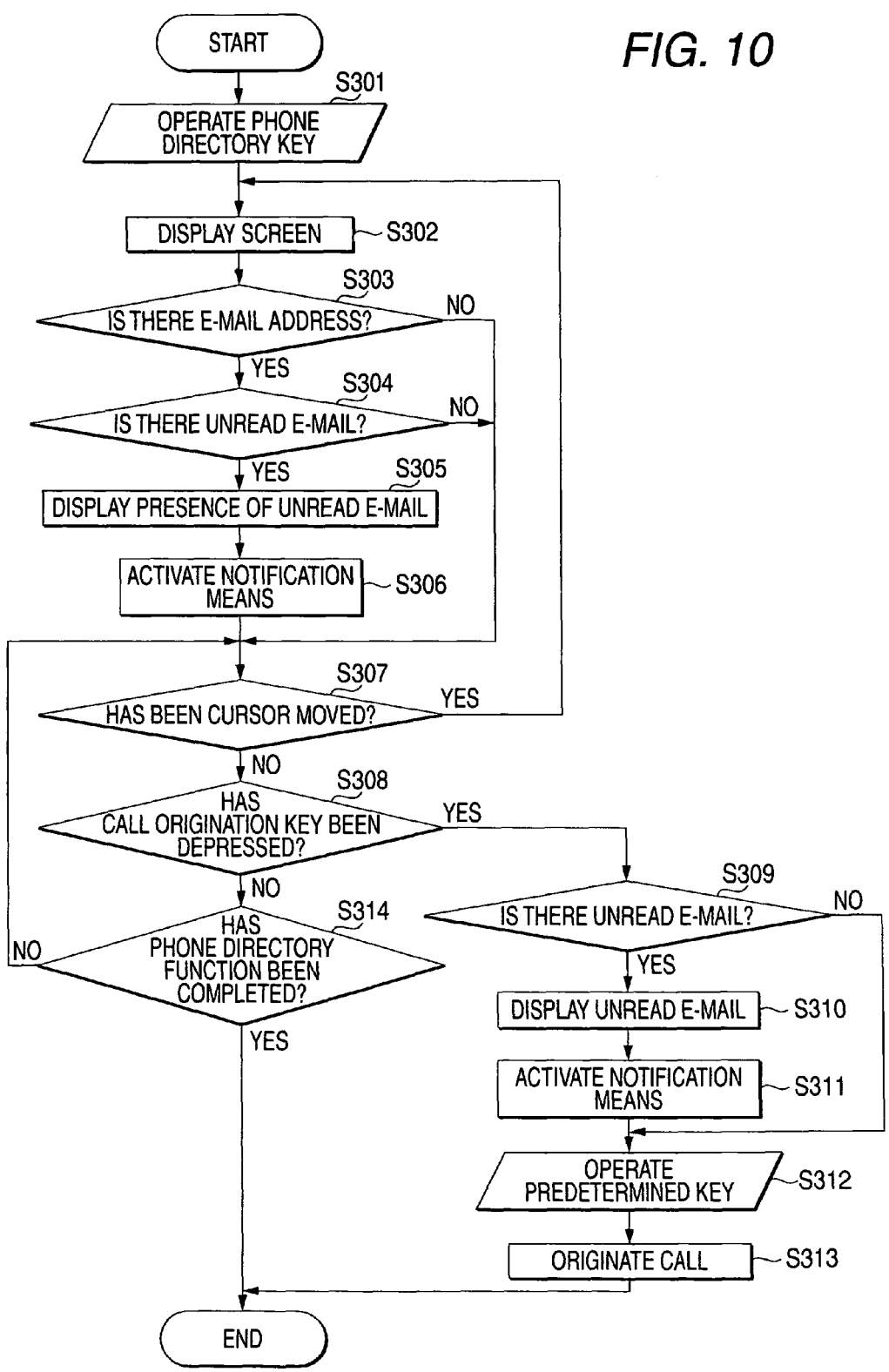
FIG. 10 shows a flow chart showing processing for notifying an unread E-mail when the portable cellular phone of the embodiment originates a call after listing phone directory data.

FIG. 10 shows a processing flowchart along which notification is made if, when a call is originated by listing a phone directory, there is an unread E-mail originated from the E-mail address registered in the piece of the phone directory data pointed at with the cursor. FIG. 10 shows a flowchart achieved when an unread E-mail is displayed before the control section 51 performs call origination processing.

When the control section 51 detects that phone directory start-up operation is performed by the operation section 53 (S301), pieces of phone directory data equal in number to pieces of data that can be displayed on the display section 57 are listed on the display section 57 (S302). At the time of displaying of the list, the phone directory data are displayed while one of pieces of the phone directory data is pointed at with a cursor. All E-mail addresses registered in the phone directory data pointed at with the cursor are acquired, and there is performed a search through the received E-mail DB stored in the storage section 52, thereby acquiring information about unread E-mails transmitted from these E-mail addresses. When there is an unread E-mail (Yes in S304), the presence of an unread E-mail is displayed as shown in, e.g., FIG. 7 (S305). There is activated notification unit, which includes activation of the vibrator (S306).

When the control section 51 detects that operation for moving a cursor is performed by the operation section 53 (Yes in S307), the display on the display section 57 is switched, to thus display a list of phone directory data over which the cursor has been moved, and processing pertaining to steps S302 to S307 is iterated. When the control section 51 detects that call origination operation is performed by the operation section 53 (Yes in S308) and when information about an unread E-mail acquired in step S304 is available (Yes in S309), the unread E-mail is displayed as shown in, e.g., FIG. 8 (S310), and there is activated notification unit, which includes activation of the vibrator (S311). When operation of a predetermined key is accepted (S312), call origination processing is performed (S313). During processing shown in FIG. 10, presence of an unread E-mail is notified in both at the time of listing of a phone directory and at the time of origination of a call. However, the presence of an unread E-mail may also be notified only at either of timings.

As mentioned above, the user can thoroughly ascertain contents of an E-mail to be grasped before initiation of a conversation by notifying the presence of an unread E-mail at the time of call origination through use of the notification unit, such as a vibrator. Since the contents of the E-mail are displayed on the display section 57, the contents of the E-mail can be ascertained quickly, so long as the user can visually ascertain the display section 57. Further, even when the user cannot visually ascertain the display section 57, reading voice generated by the voice reading function is output from the voice input/output section 54 in response to predetermined operation, and hence the user can grasp contents of the E-mail.

Whether or not to read contents of an unread E-mail aloud when there is an unread E-mail is optional for the user. Therefore, in the event of; for example, an emergency contact, the user can proceed to conversation without consuming time, which would otherwise be caused by reading an unread E-mail.

Moreover, presence of an unattended incoming call may also be notified at the time of listing of the phone directory data or origination of a call. When the phone directory data are listed, there is performed a search through the incoming call history DB stored in the storage section 52 by use of the phone number pointed at with the cursor. When a phone number identical with the phone number pointed at with the cursor is registered in the phone directory data, there is made a search through the incoming call history DB by use of the phone number also. When an unattended incoming call originated from the phone number is registered in the incoming call history DB, a display showing presence of an unattended incoming call is provided. When predetermined operation is performed by the operation section 53 while the display is provided, the time and date of arrival of the unattended incoming call, the phone number of the call, and presence/absence of a message in an answering machine are displayed on the display section 57. Information about an unattended incoming call displayed on the display section 57 can also be converted into voice by use of the voice reading function, and the voice can be output by the voice output section 54.

Figure 11:
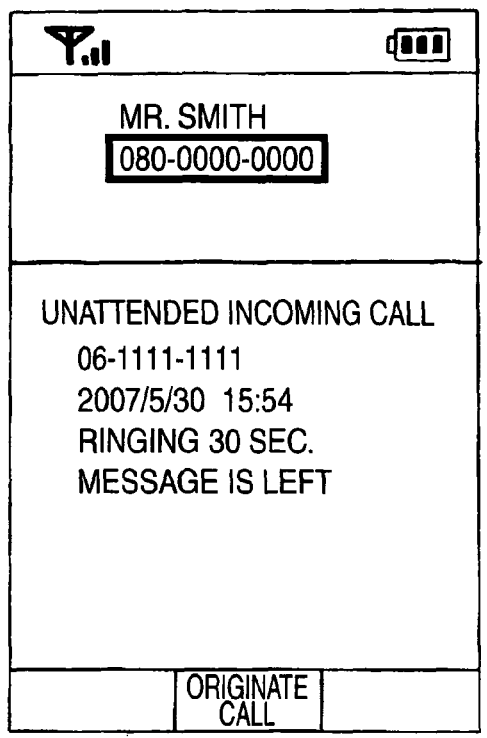
FIG. 11 shows an example display in which the portable cellular phone of the embodiment displays unattended incoming call information after detecting call origination operation.

In a case where presence of the unattended incoming call is notified at the time of origination of a call, there is performed a search as to whether or not an unattended incoming call originated from the phone number of the opponent is in the incoming call history DB when the control section 51 detects that operation for originating a call has been performed by the operation section 53. When a plurality of phone numbers are registered as phone directory data in an associated manner, there is also performed a search as to whether or not an unattended incoming call from the phone number identical with the phone number of the opponent registered in the phone directory data is in the incoming call history DB. When an unattended incoming call is present, the vibrator is activated or sound is emitted, thereby notifying presence of the unattended incoming call. Further, the time and date of arrival of the unattended incoming call, the phone number of the call, presence/absence of a recorded message, and the like, are displayed on the display section 57. When a display is provided by suspending communication processing performed by the communication section 55, whether or not call origination is made is displayed, as shown in FIG. 11, in a format that can be input by the operation section 53. When a display is provided in the middle of communication processing being performed by the communication section 55, the display is provided along with a phone number of a party with which communication is now being established, as shown in FIG. 12.

When predetermined operation is performed by the operation section 53 while a display, such as that shown in FIG. 11, appears, the time and date of arrival of an unattended incoming call, a phone number of the call, and presence/absence of a recorded message are converted into a voice signal by the voice reading function, and the voice signal is output from the voice input/output section 54. When there is a recorded message, the message may also be played back. When an instruction for call origination issued by the operation section 53 is received while the display shown in FIG. 11 is displayed, a call is originated to the phone number displayed in the screen display shown in FIG. 11. At this time, when the phone number for which an instruction for call origination has been issued before appearance of the display, such as that shown in FIG. 11, differs from the phone number displayed as the unattended incoming call history data, there may also be accepted operation for selecting a phone number to which a call is to be originated by the operation section 53. For instance, when the screen shown in FIG. 11 is displayed on the display section 57, operation for selecting whether to originate a call to a phone number "080-0000-0000" or a phone number "06-1111-1111" may also be accepted by the operation section 53. As mentioned above, a phone number of an opponent can be selected while a screen, such as that shown in FIG. 11, is displayed. By ascertaining an unattended incoming call, the user can readily make a change even when desiring to make a change to operation for originating a call to the phone number of the party who is a call originator of the unattended incoming call.

Figure 12:
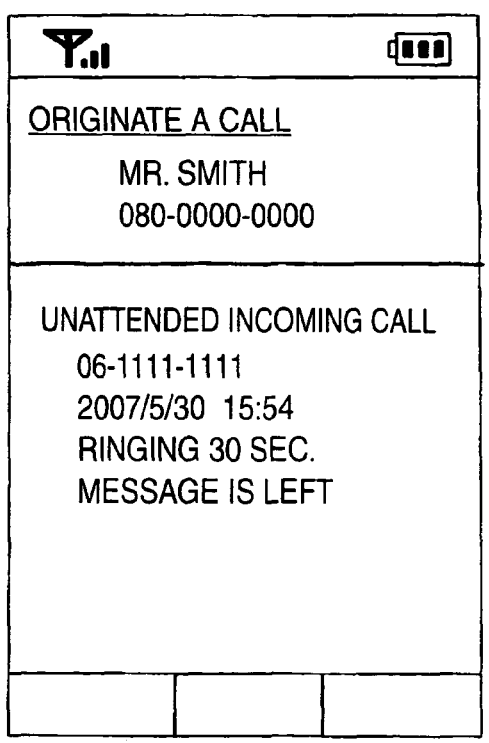
FIG. 12 shows an example display in which the portable cellular phone of the embodiment displays unattended incoming call information after detecting call origination operation.

When presence of an unattended incoming call is notified after the communication section 55 initiated call origination processing (when a display, such as that shown in FIG. 12, is provided), on-hook operation can be performed by the operation section 53. When on-hook operation is accepted, operation differing from the on-hook operation may also be accepted without erasing a display of an unattended incoming call on the screen shown in FIG. 12, thereby erasing the display of the unattended incoming call. For instance, when on-hook operation is performed by the operation section 53 while a screen, such as that shown in FIG. 12, is displayed, the screen changes to a display, such as that shown in FIG. 11. When an instruction for call origination is issued by the operation section 53 while the screen display shown in FIG. 11 is provided, a call may also be re-originated to the phone number displayed in FIG. 11. The phone number of the opponent may also be a phone number ("080-0000-0000") achieved when call origination operation is received in response to operation of the operation section 53 before appearance of the screen shown in FIG. 12 or a phone number ("06-1111-1111") displayed as the unattended incoming call history.

Figure 13:
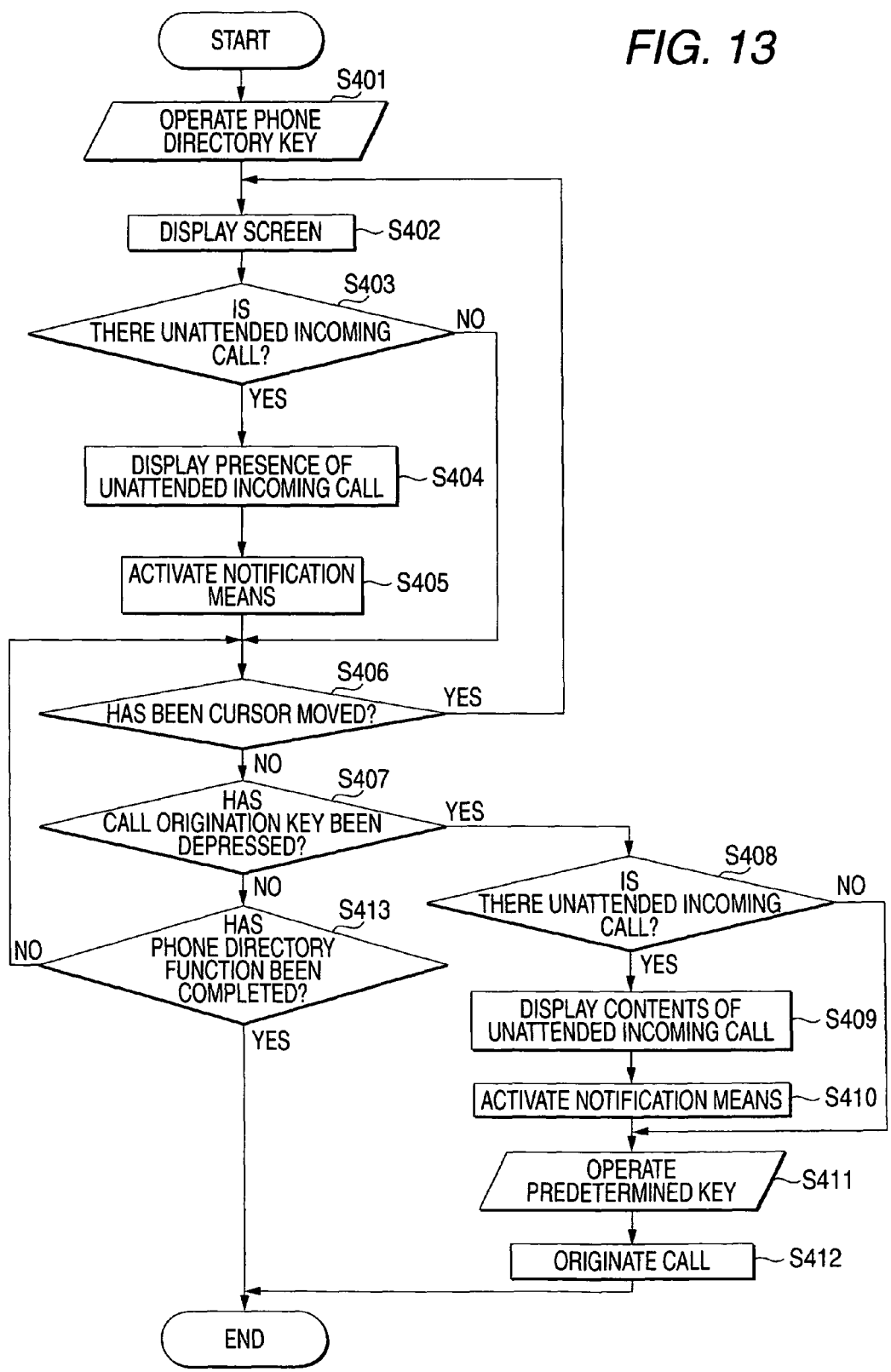
FIG. 13 shows a flowchart showing processing for notifying an unattended incoming call when the portable cellular phone of the embodiment originates a call after listing phone directory data.

FIG. 13 is another flowchart of processing for sending notification if there is an unattended incoming call from a phone number of the piece of the phone directory data pointed at with the cursor when a call is originated while the phone directory is displayed. FIG. 13 shows a flowchart achieved when an unattended incoming call is displayed before the control section 51 performs call origination processing.

When the control section 51 detects that phone directory start-up operation has been performed by the operation section 53 (S401), pieces of the phone directory data equal in number to pieces of data that can be displayed on the display section 57 are listed (S402). When a list is displayed, the display is provided while the cursor is placed at one of the pieces of the phone directory data. All phone numbers registered in the piece of the phone directory data pointed at with the cursor are acquired; there is performed a search through the incoming call history DB stored in the storage section 52; and unattended incoming call information is acquired from these phone numbers. When there is an unattended incoming call (Yes in S403), presence of the unattended incoming call is displayed (S404), and there is activated notification unit, which includes activation of the vibrator (S405).

When the control section 51 detects that cursor movement operation has been performed by the operation section 53 (Yes in S403), the display on the display section 57 is switched, thereby displaying the list of phone directory data over which the cursor is moved. Thus, processing pertaining to steps S402 to S406 is iterated. When the control section 51 detects that call origination operation has been performed by the operation section 53 (Yes in S407) and when there is unattended incoming call information acquired in step S403 (Yes in S408), the unattended incoming call information is displayed as shown in, e.g., FIG. 11 (S409), and there is activated the notification unit, which includes activation of the vibrator (S410). When a predetermined key has been operated by the operation section 53 (S411), call origination processing is initiated (S412). As mentioned above, presence of an unattended incoming call is also notified in FIG. 13 at the time of listing of the phone directory and at the time of origination of a call. However, notification may also be made either of the timings.

Presence of an unattended incoming call is notified at the time of listing of the phone directory data or origination of a call as mentioned above, so that the user can be notified without fail of arrival of an unattended incoming call before conversation. At this time, if the notification pattern is made different between the case where a message is recorded and the case where no message is recorded, the user can also be prompted to make conversation after ascertaining a recorded message. An unattended incoming call that is an object of notification may be an unattended incoming call arrived a predetermined period of time before the current time. As a result, notification of an old unattended incoming call, such as an incoming call unattended a month ago, can be prevented.

Moreover, presence of schedule data may also be notified at the time of listing of phone directory data or origination of a call. The schedule data that are objects of notification are schedule data including names registered in the phone directory data. A name is read from the phone directory data where there is registered the phone number pointed at with a cursor at the time of listing of the phone directory data. A character string of the name is retrieved from character strings registered in the schedule DB stored in the storage section 52. Although full names are also registered in the phone directory data, there are many cases where either first names or last names are included in the schedule data. Hence, the name read from the phone directory data is separated into a first name and a last name, and a search for the first name and a search for the last name are also conducted. Since there is a case where the user places; for example, a blank space, between a first name and a last name, a method for separating a name by the blank space is also available.

A range over which there is made a search through the schedule DB may be all of the pieces of data registered in the schedule DB or schedule data registered as times within a predetermined period of time with reference to the current point in time (e.g., schedule data pertaining to this day, schedule data pertaining to the current time and subsequent times, and the like). When a result of search shows presence of a character string matching the name, a message indicating presence of the schedule data is displayed on the display section 57. The display of the schedule data may also be provided by a display, such as that described by reference to, e.g., FIG. 7. When predetermined operation is input by the operation section 53 while the display is provided on the display section 57 and when a plurality of details of the schedule data or a plurality of pieces of corresponding schedule data are available, they are listed. The schedule data may also be converted into a voice signal by use of the voice reading function, and the signal can also be output from the voice input/output section 54.

Figure 14:
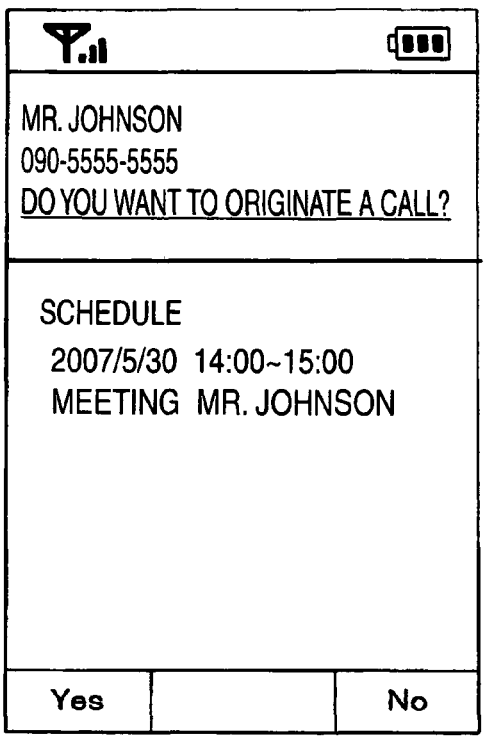
FIG. 14 shows an example display in which the portable cellular phone of the embodiment displays schedule information after detecting call origination operation.
Figure 15:
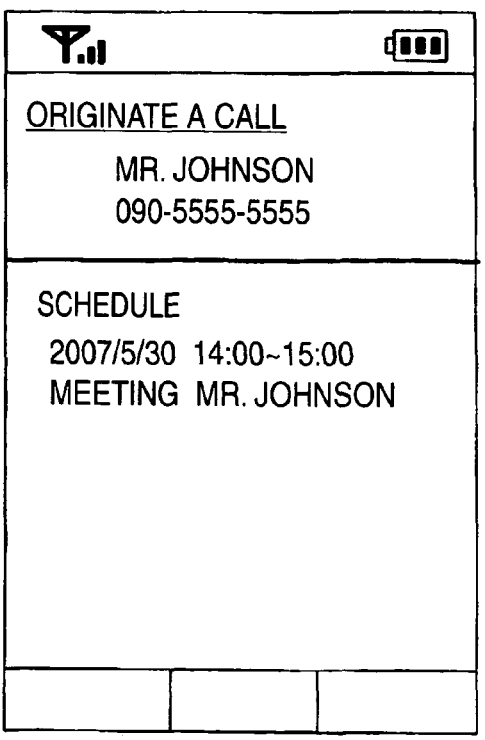
FIG. 15 shows an example display in which the portable cellular phone of the embodiment displays schedule information after detecting call origination operation.

Even when presence of the schedule data is notified at the time of origination of a call, there is performed a search through the schedule DB as in the case of listing of the phone directory. When schedule data are present, the notification unit, such as a vibrator or sound, is activated, and a display is provided on the display section 57 as shown in FIG. 14 or FIG. 15. Since display timing, transition of a screen, a reading function shown in FIG. 14 or FIG. 15 are analogous to those shown in FIG. 8 or FIG. 9, and hence their explanations are omitted.

Figure 16:
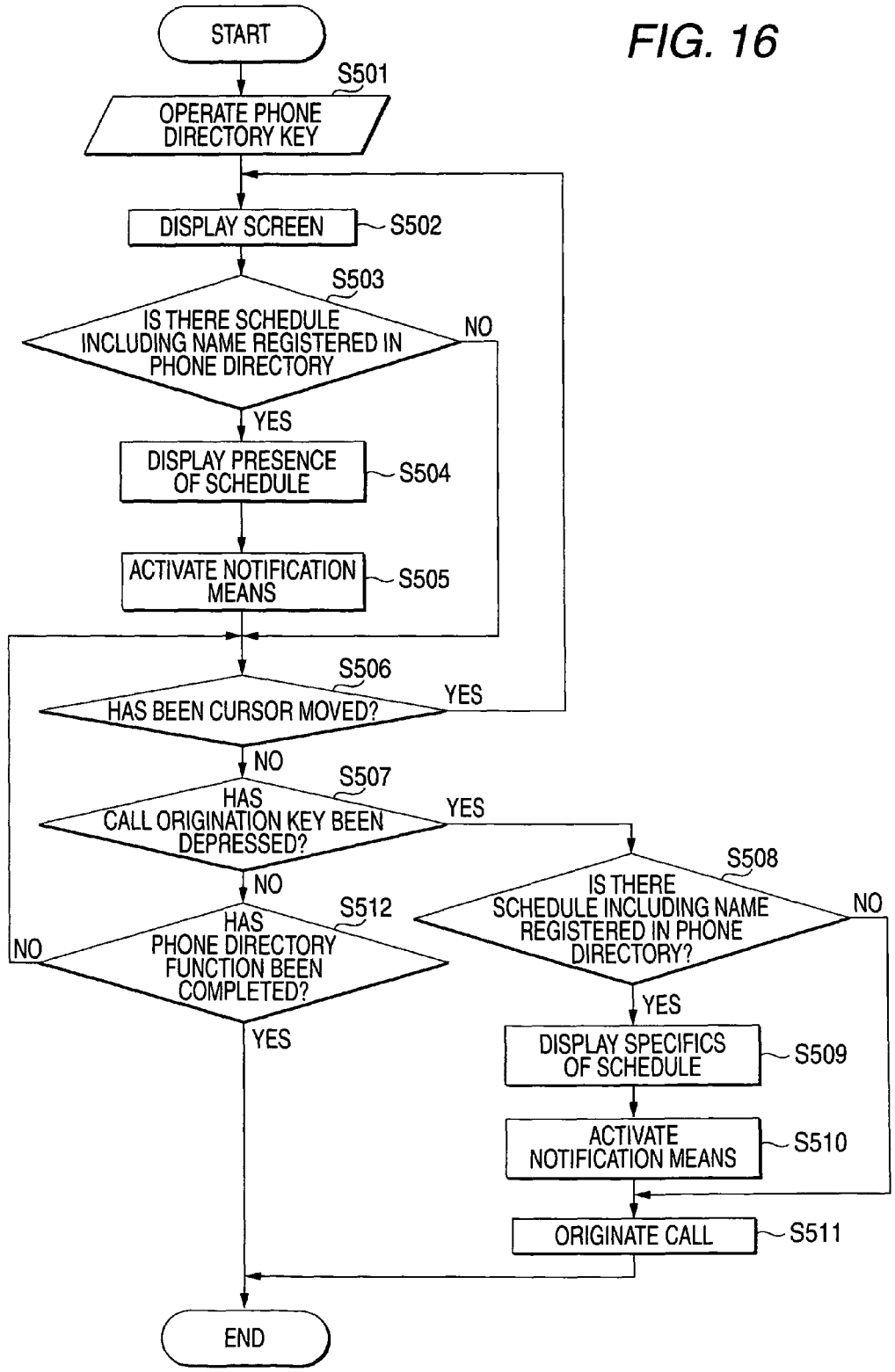
FIG. 16 shows a flowchart showing processing for notifying schedule data when the portable cellular phone of the embodiment originates a call after listing phone directory data.

FIG. 16 is an example flowchart of processing for sending notification if schedule data pertaining to this day, including the name registered in the phone directory data pointed at with the cursor, are present when a call is originated while the phone directory is listed. FIG. 16 shows a flowchart employed when schedule data are displayed before the control section 51 performs call origination processing.

When the control section 51 detects that phone directory start-up operation has been performed by the operation section 53 (S501), pieces of phone directory data equal in number to pieces of data that can be displayed on the display section 57 are listed (S502). The list is displayed while one of the pieces of the phone directory data is pointed at with the cursor. A name registered in the phone directory data pointed at with the cursor is acquired, and there is performed a search for the name through the schedule DB stored in the storage section 52, thereby acquiring schedule data including the name. When the schedule data are present (Yes in S503), a display indicting presence of the schedule data is provided on the display section 57 (S504). There is activated notification unit, including activation of the vibrator (S505).

When the control section 51 detects that cursor movement operation has been performed by the operation section 53 (Yes in S506), the display of the display section 57 is switched; the phone directory data over which the cursor has been moved is listed; and processing pertaining to steps S502 through S506 is iterated. If schedule data are already been acquired in step S503 (Yes in S508) when the control section 51 detects that call origination operation has been performed by the operation section 503 (Yes in S507), specifics of the schedule are displayed as shown in FIG. 14 (S509), and there is activated the notification unit, including activation of the vibrator (S510). When a predetermined key is operated (S511), call origination processing is initiated (S512). As mentioned above, presence of the schedule data is notified both at the time of listing of the phone directory and the time of origination of a call in FIG. 13. However, notification may also be made either of the timings.

As mentioned above, presence of schedule data can be notified at the time of listing of phone directory data and origination of a call, and hence the user can conduct conversation on the basis of the specifics of the schedule data.

Notification of an unread E-mail, notification of an unattended incoming call, and notification of relevant schedules, such as those mentioned above, can also be applied to arrival of an incoming call as well as to listing of phone directory data and origination of a call. Further, notification can also be applied to displaying of a history of originated calls and incoming calls.

By adoption of the configuration of the embodiment, such as that mentioned above, notification can be made before communication in such a way that information about an opponent can be ascertained. The present invention is not limited to the embodiment provided above and may also be subjected to alterations, as needed, within the scope of the present invention.

According to the above-mentioned embodiment, a communication device enables easy acquisition of various pieces of information about an opponent before initiation of communication.

What is claimed is:

1. A communication device comprising:
   a communication unit configured to communicate with an opponent by an electric communication network;
   a vibration unit configured to generate a vibration at a predetermined vibration pattern;
   a storage unit configured to store communication data including communication information items related to calls made by the communication unit, and identification information items of opponents in association with the communication information items;
   a display unit configured to display a list of the identification information items from the storage unit;
   an operation unit configured to accept an operation for moving a cursor to point at one of the identification information items in the list displayed by the display unit;
   a control unit configured to activate the vibration unit in accordance with the one of the identification information items pointed at with the cursor; and
   a clock unit configured to acquire a current date and time, wherein date and time information is stored in the storage unit in association with the identification information items,
   wherein the control unit stores time and date information in association with the one of the identification information items pointed at with the cursor and activates the vibration unit when a difference between the stored time and date information and current time and date information acquired by the clock unit is within a predetermined period of time.

2. The communication device according to claim 1, wherein the predetermined vibration pattern can be registered in the storage unit in association with the identification information items, and
   wherein the control unit activates the vibration unit in the predetermined vibration pattern when the predetermined vibration pattern is stored in association with the one of identification information items pointed at with the cursor.

3. The communication device according to claim 1, wherein a type of the identification information items can be registered in the storage unit in association with the identification information items, and
   wherein the control unit activates the vibration unit at the predetermined vibration pattern conforming to the type of the identification information items if the type of the identification information items is registered in association with the one of identification information items pointed at with the cursor.

4. The communication device according to claim 1, wherein positional information about the opponent is stored in the storage unit in association with the identification information items, and
   wherein the control unit activates the vibration unit in accordance with the positional information stored in association with the one of identification information items pointed at with the cursor and positional information about the communication device.

5. The communication device according claim 1, wherein the storage unit is configured to store a plurality of pieces of identification information about the opponent in association with designation information about the opponent and to store the predetermined pattern of the vibration unit in association with respective pieces of identification information, and
   wherein the control unit is configured to activate the vibration unit at the predetermined vibration pattern when the one of the plurality of pieces of identification information pointed at with the cursor is stored in the storage unit in association with the predetermined vibration pattern.

6. The communication device according to claim 5, wherein the identification information items of opponents is either one of a phone number and an E-mail address, and
   wherein the predetermined vibration pattern is stored in the storage unit in association with either one of the phone number and the E-mail addresses.

7. The communication device according to claim 1, wherein the storage unit is configured to store a phone directory database where a phone number of the opponent and an E-mail address of the opponent are registered and associated with each other and a E-mail database where a E-mail received by the communication unit is registered in association with an E-mail address of the opponent,
   wherein the identification information items include the phone number registered in the telephone directory database stored in the storage unit, and wherein the control unit is configured to activate the vibration unit when an E-mail received from the E-mail address registered in the phone directory database in association with the phone number pointed at with the cursor is registered, in an unread state, in the E-mail database.

8. The communication device according to claim 1, wherein the storage unit is configured to store and register a phone directory database in an association with at least one of phone numbers of the opponent and an incoming call history database registering history of the voice communication, wherein the identification information items include the phone number registered in the telephone directory database stored in the storage unit, and
wherein the control unit is configured to activate the vibration unit when the history of voice communication originated from a phone number pointed at with the cursor and the history of voice communication originated from a phone number stored in the phone directory database in association with the pointed phone number are registered in the incoming call history database as unattended incoming calls.

9. The communication device according to claim 1 further comprising:
wherein the storage unit is configured to store a phone directory database where a phone number of the opponent can be registered in associate with text information and a schedule database where time and date information can be registered in association with the text information,
wherein the identification information items include the phone number registered in the opponent in the phone directory database, and
wherein the control unit is configured to activate the vibration unit when the time and date information within a predetermined period time counted from the current time and date acquired by the clock unit is registered in the schedule database in association with at least part of text information stored in the phone directory database in associate with a phone number pointed at with the cursor.

10. A communication device comprising:
a communication unit configured to communicate with an opponent by an electric communication network;
a vibration unit configured to generate a vibration at a predetermined vibration pattern;
a storage unit configured to store communication data including communication information items related to calls made by the communication unit, and identification information items of opponents in association with the communication information items;
an operation unit configured to accept a call origination operation performed by the communication unit;
a control unit configured to activate the vibration unit when one of the communication information items in association with one of the identification information items of an opponent corresponding to the call original operation accepted by the operation unit is registered in the communication data of the storage unit; and
a clock unit configured to acquire a current time and date, wherein time and date information is registered in the storage unit in association with the identification information items of opponents,
wherein, when the operation unit accepts a call origination operation, the control unit activates the vibration unit if time and date information is stored in association with identification information items of opponents and if a difference between the time and date information and current time and date information acquired by the clocking unit are within a predetermined period of time.

11. The communication device according to claim 10, wherein a predetermined vibration pattern can be registered in the storage unit in association with the identification information items of opponents, and
wherein the control unit activates the vibration unit at the predetermined vibration pattern when the predetermine vibration pattern is registered in association with the identification information items of opponents when a call origination operation is accepted by the operation unit.

12. The communication device according to claim 10, wherein the storage unit can register a type of the identification information in association with the identification information items of opponents; and
wherein the control unit activates the vibration unit at the vibration pattern conforming to the type of the identification information if the type of the identification information is registered in association with the identification information items of opponents when a call origination operation is accepted by the operation unit.

13. The communication device according to claim 10, wherein positional information about the opponent is stored in the storage unit in association with the identification information items of opponents, and,
wherein, when the operation unit accepts a call origination operation, the control unit activates the vibration unit in accordance with positional information stored in association with the identification information items of opponents and positional information about the communication device.

14. The communication device according to claim 10, wherein the storage unit is configured to store a plurality of pieces of identification information about the opponent in association with designation information items of opponents and the predetermined vibration pattern activated at the time of receipt of an incoming call or origination of a call from the identification information in association with the respective pieces of identification information, and
wherein the control unit is configured to activate the vibration unit at the predetermined vibration pattern if the identification information is stored in the storage unit in association with the vibration pattern at the time of arrival of an incoming call or origination of a call.

15. The communication device according to claim 14, wherein the identification information about the opponent is either one of a phone number and an E-mail address, and
wherein the predetermined vibration pattern is stored in the storage unit in association with either one of the phone number and the E-mail addresses.

16. The communication device according to claim 10, wherein the storage unit is configured to store a phone directory database where a phone number of the opponent and an E-mail address of the opponent are registered and associated with each other and a mail database where a mail received by the communication unit is registered, and
wherein the control unit is configured to activate the vibration unit if an E-mail received from an E-mail address registered in the phone directory database in association with the phone number of the opponent is registered, in an unread state, in the E-mail database when the call origination operation is accepted by the operation unit.

17. The communication device according claim 10, wherein the storage unit is configured to store a phone directory database where at least one of phone numbers of the opponent can be registered and an incoming call history database where a history of the voice communication performed by the communication unit, and wherein the control unit configured to activate the vibration unit if a history of voice communication originated form a phone number of the opponent and a history of voice communication originated from a phone number stored in the phone directory database in association with the phone number of the opponent are registered, as unattended incoming calls, in the incoming call history database when the operation unit accepts call origination operation.

18. The communication device according to claim 10 further comprising:

wherein the storage unit is configured to store a phone directory database where a phone number of the opponent and text information associated with the phone number of the opponent can be registered and a schedule database where time and date information and the text information are registered in an associated manner, and wherein the control unit is configured to, when the operation unit accepts a call origination operation, activate the vibration unit if the schedule database registers a time and date within a predetermined period of time starting from a current time and date acquired by the clock unit which is associated with at least part of the text information stored in the phone directory database in association with the phone number of the opponent.

* * * * *